Patented Mar. 13, 1945

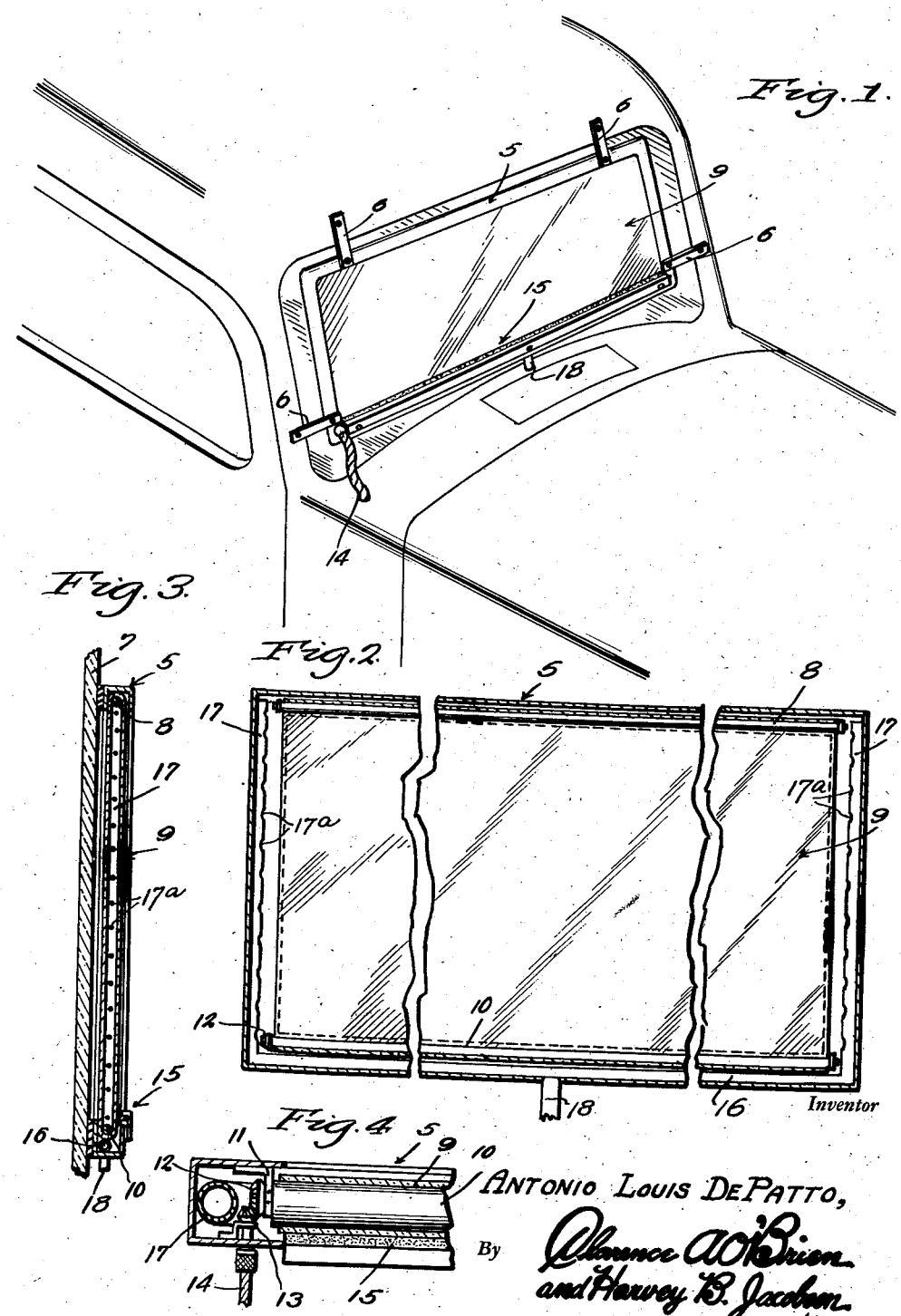

2,371,430

UNITED STATES PATENT OFFICE 2,371,430

AUTOMOBILE WINDSHIELD ATTACHMENT

Antonio L. De Patto, Watertown, Mass., assignor of one-half to Lena Cerniglia L. De Patto, Watertown, Mass.

Application July 3, 1944, Serial No. 543,404

2 Claims. (Cl. 160—86)

This invention relates to a novel and improved attachment for automobile windshields which is characterized by a novel auxiliary windshield and a wiper therefor.

More specifically, the invention has reference to a frame commensurate in area with the regular windshield, this frame being secured to the exterior of said windshield and being provided with an endless transparent belt operating over a driven shaft and an idling shaft to constantly present a clear view to the driver, this by reason of an appropriate wiper having continuous wiping contact with said belt.

Another phase of the invention has to do with the frame attachment unit characterized by the endless auxiliary windshield, and associated distributor means for hot air which is calculated to assist in maintaining the aforementioned unobstructed and clear vision and which is particularly useful in minimizing the likelihood of accumulation of snow and sleet on the auxiliary windshield.

Other features and advantages will become more readily apparent from the following description and the accompanying illustrative drawing.

In the drawing, wherein like numerals are employed to designate like parts throughout the views—

Figure 1 is a perspective view of a portion of an automobile with the improved auxiliary windshield attachment thereon.

Figure 2 is a fragmentary view with parts in section and parts in elevation showing the essential elements of the attachment.

Figure 3 is a central transverse section through the attachment and the associated portion of the main windshield to bring out the construction and relationship of parts.

Figure 4 is an enlarged fragmentary detail section of the means employed for actuating the endless auxiliary windshield.

Referring now to the drawing by distinguishing reference numerals it will be seen that the attachment comprises a substantially rectangular frame 5 of channel-shaped cross-sectional form and of suitable material. This frame is secured by appropriate clips or fastenings 6 to the body of the automobile as shown in Figure 1. This places the frame in contact with the regular windshield, that is, the main windshield 7. It will be noticed that the frame 5 is of an area substantially equal to that of the main windshield.

As brought out in Figure 2, I provide an idling shaft or roller 8 in the upper portion of the frame, this mounted in suitable brackets. It is rubber-covered to accommodate the endless belt-like auxiliary windshield 9, the latter being of transparent flexible glass or an equivalent plastic or cellulose product. This auxiliary windshield is also trained over the idling shaft or roller 8 and then over a companion driving shaft 10, which latter shaft is mounted in appropriate bearings 11, as brought out in Figure 4. This shaft 10 is also rubber-covered to frictionally drive the auxiliary windshield. Further, at one end it is provided with a beveled gear 12 with which the driving pinion 13 is in mesh. The driving pinion is driven by a suitable flexible shaft 14 deriving power from any appropriate part of the engine. The endless auxiliary windshield is stretched tautly between the two shafts and driven thereby and rain and moisture is scraped therefrom by a stationary windshield wiper 15 disposed across the bottom of the frame.

The heater is a U-shaped element and includes a main branch 16 with a pair of lateral branches 17, the latter confined in the adjacent portions of the frame and having ports 17a from which jets of hot air issue. This U-shaped heater receives hot air from an appropriate source by way of the intake branch 18. Thus, the device is supplied with hot air and depositing of snow and ice is virtually prevented.

It is thought that persons skilled in the art to which the invention relates will be able to obtain a clear understanding of the invention after considering the description in connection with the drawing. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. A windshield attachment comprising a rectangular frame having channel-shaped frame members, upper and lower parallel shafts mounted for rotation in the longitudinal frame members, means for driving one of said shafts, and an endless transparent flexible glass auxiliary belt-like windshield trained over said shafts.

2. A windshield attachment comprising a rectangular frame having channel-shaped frame members, upper and lower parallel shafts mounted for rotation in the longitudinal frame members, means for driving one of said shafts, an endless transparent flexible glass auxiliary belt-like windshield trained over said shafts, and a substantially U-shaped heater embodied in said frame and including distributing branches with jet ports located for heating the flights of the auxiliary windshield.

ANTONIO L. DE PATTO.